A. SCHNEBELEN.
DOUGH RAISER.
APPLICATION FILED JAN. 2, 1914.
1,143,787.
Patented June 22, 1915.
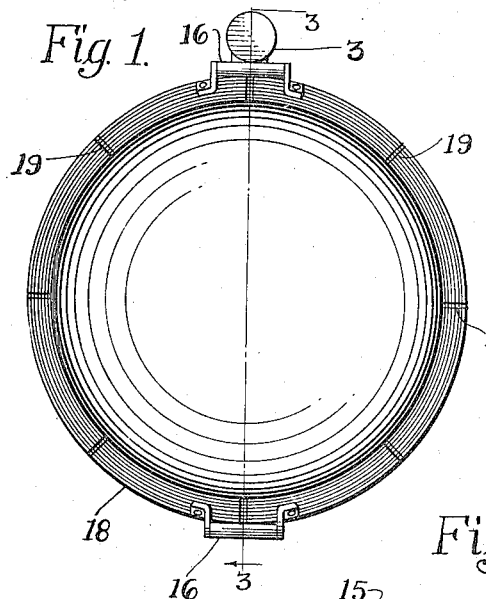
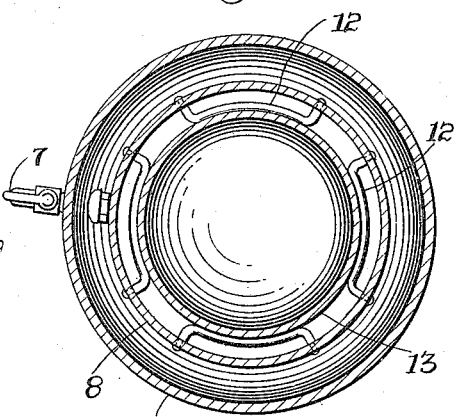
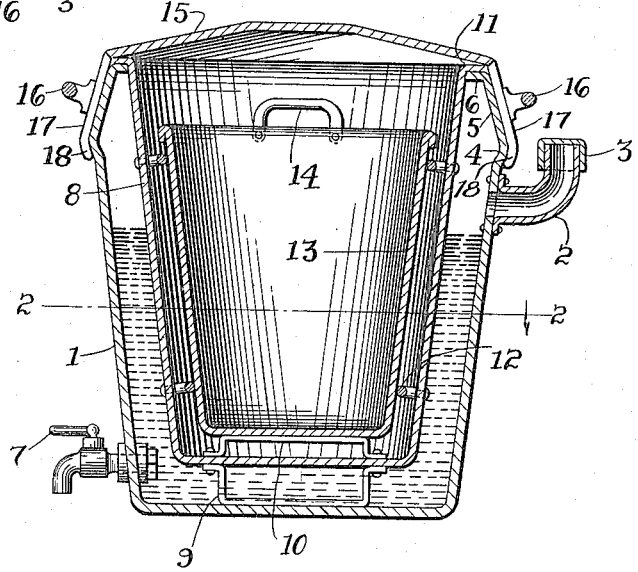
Witnesses:
H. Goldberger
A. S. Nickelsen
Inventor:
A. Schnebelen
H. Darden
Att'y.

UNITED STATES PATENT OFFICE.

AUGUST SCHNEBELEN, OF CANTON, OHIO.

DOUGH-RAISER.

1,143,787. Specification of Letters Patent. Patented June 22, 1915.

Application filed January 2, 1914. Serial No. 809,979.

*To all whom it may concern:*

Be it known that I, AUGUST SCHNEBELEN, a citizen of the United States, residing at Canton, in the county of Stark and State of Ohio, have invented certain new and useful Improvements in Dough-Raisers, of which the following is a specification.

This invention relates to improvements in dough raisers and its object is to produce a device of this class that is simple in construction, cheap to manufacture and that uses hot water as a heating agent.

With the foregoing and other objects in view the invention consists in the combination and arrangement of parts to be hereinafter fully described in the following specification, pointed out in the claims and illustrated in the accompanying drawing which forms a part of said specification and in which—

Figure 1 is a plan of my improved dough raiser. Fig. 2 is a cross section taken on line 2—2 of Fig. 3. Fig. 3 is a vertical section taken on line 3—3 of Fig. 1.

Like reference characters indicate corresponding parts throughout the several views.

The reference numeral 1 indicates a water containing vessel which is provided with an inlet tube 2 which carries a removable cap 3. Just above the inlet tube the vessel is provided with a bulged annular portion 4 and from this portion the vessel slopes inwardly as at 5 and terminates in the annular flange 6 disposed at right angles to the perpendicular. The vessel is further provided with the spigot 7. Within the vessel 1 an intermediate vessel 8 is disposed which is provided with an external angular support 9 adapted to rest upon the base of the water containing vessel and with an interior angular support 10. The intermediate vessel is formed at its upper with an outwardly extending annular flange 11 adapted to rest upon the flange 6 of the vessel 1 and said intermediate vessel is further provided with a plurality of curved spacing bars 12 projecting into the interior of the vessel for contact with the periphery of the dough receiving vessel 13, the base of which rests upon the support 10 and which is provided with handles 14, 14.

15 is a cover provided with handles 16, 16 and formed with a flange 17 that conforms to the contour of the portion 5 of the vessel 1 and said flange terminates in a bulged annular portion 18 that is adapted to frictionally engage the bulged portion 4 of the vessel 1 and which may be snapped or sprung into or out of engagement with that portion on account of the formation of slots 19 in said cover.

When the device is assembled, as shown in Fig. 3, the hot water is introduced into the vessel 1 through the medium of the tube 2 preferably until it rises approximately to the height of that tube and then completely surrounds the lower part of the intermediate vessel 8 which is preferably made of a good heat conducting material. The connection between the vessels 1 and 8 coupled with the peculiar construction of the cover 15 is such that steam from the water in the vessel 1 is confined within that vessel and caused to heat the air within the vessel 8 which air also circulates within the vessel 13 and greatly facilitates the raising or fermentation of the dough within said vessel.

What is claimed is:—

1. A dough raiser comprising a water containing vessel provided with an inlet tube and with an annular bulged portion immediately above said tube and sloping inwardly beyond said bulged portion and terminating in an inwardly extended flange disposed at right angles to the perpendicular, an intermediate vessel disposed within said water containing vessel and formed with an outwardly extending annular flange adapted to rest normally upon the flange of said water containing vessel, a dough containing vessel disposed within said intermediate vessel and spaced away therefrom and a cover provided with handles and adapted for frictional engagement with the bulged portion and with the inwardly sloping portion of the said water containing vessel.

2. A dough raiser comprising a water containing vessel provided with an inlet tube and with an annular bulged portion immediately above said tube and sloping inwardly beyond said bulged portion and terminating in an inwardly extending flange disposed at right angles to the perpendicular, an intermediate vessel disposed within said water containing vessel and formed with an outwardly extending annular flange adapted to rest normally upon the flange of said water containing vessel, a dough containing vessel disposed within said intermediate vessel and uniformly spaced away from the same and a cover provided with handles and with a plurality of slots and adapted for frictional engagement with the bulged portion and with the inwardly sloping portion of the said water containing vessel.

In testimony that I claim the foregoing as my own I have hereto affixed my signature in the presence of two subscribing witnesses.

AUGUST SCHNEBELEN.

Witnesses:
EUGEN KACK,
WILLIAM JACOB.

Copies of this patent may be obtained for five cents each, by addressing the "Commissioner of Patents, Washington, D. C."